United States Patent Office 3,642,662
Patented Feb. 15, 1972

3,642,662
SYNTHESIS OF SODIUM FAUJASITE
David P. Macarus and Lawrence L. Upson, Wallingford, Pa., and Ronald T. Wood, Wilmington, Del., assignors to Air Products and Chemicals, Inc., Philadelphia, Pa.
No Drawing. Filed Nov. 17, 1969, Ser. No. 877,418
Int. Cl. B01j 11/40; C10b 33/28
U.S. Cl. 252—455 Z                          4 Claims

ABSTRACT OF THE DISCLOSURE

A composite containing more than about 20% sodium faujasite is prepared from a precursor containing about 19% alumina alpha trihydrate in combination with 81% de-exothermed kaolin that is, kaolin calcined at a temperature low enough that no significant amount of mullite is formed but high enough that the product exhibits, upon analysis by Differential Thermal Analysis, a DTA exotherm which is less than about 8% of the DTA exotherm of a raw kaolin or metakaolin. The mixture of alumina trihydrate and de-exothermed kaolin has a silica to alumina ratio of about 1.5 to 1. The mixture is dispersed in an aqueous solution of sodium hydroxide (about 4.2 to about 5 molar) to provide proportions suitable for faujasite production such as 4.5 to 5 to 1 for the aluminosilicate to water to sodium hydroxide weight ratios. The thus prepared batter is aged at ambient temperature for about 5 hours, and thereafter heated to about 100° C., and maintained at such temperature to provide sodium faujasite.

BACKGROUND OF THE INVENTION

As explained in Haden et al. 3,391,994, sodium faujasite may be prepared from a de-exothermed kaolin dispersed in an aqueous alkaline system. As explained in a series of patent applications assigned to the assignee herein, it is feasible to prepare cracking catalysts comprising faujasite, such faujasite having been derived from the de-exothermed kaolin. Some of the commonly owned co-pending applications include: Ser. No. 628,518 of Apr. 5, 1967, now U.S. Pat. 3,515,681; Ser. No. 662,304 of Aug. 22, 1967, now U.S. Pat. 3,515,511; Ser. No. 751,021 of Aug. 8, 1968, now U.S. Pat. 3,541,027 and Ser. No. 781,951 of Dec. 6, 1968, now U.S. Pat. 3,515,682.

In the method described heretofore in connection with the preparation of sodium faujasite by the processing of an aqueous alkaline dispersion of de-exothermed kaolin, a prolonged period of aging at an elevated temperature has been deemed necessary for achieving products containing as much as about 20% sodium faujasite. The total capital investment in connection with a plant for the production of faujasite-containing cracking catalyst is dependent in part upon the investment for the apparatus in which the particles are maintained at the elevated temperature. Any shortening of the step at elevated temperature can be treated as decreasing in the investment per ton of capacity of production or as increasing the production capacity of any established facility for such step of treatment at an elevated temperature. Accordingly, there have been efforts to shorten the hot aging time required to achieve at least 20% sodium faujasite in the product.

SUMMARY OF THE INVENTION

A mixture of alumina trihydrate and calcined kaolin is prepared in which the overall silica to alumina mol ratio is about 1.5 to 1. Such a mixture contains about 19% alumina trihydrate and about 81% calcined kaolin. The kaolin is calcined at a temperature and at conditions minimizing formation of readily recognizable mullite crystals and at a temperature such that the kaolin is substantially de-exothermed so that the residual Differential Thermal Analysis exotherm constitutes less than about 8% of the exotherm of metakaolin.

The mixture of alumina trihydrate and de-exothermed kaolin is dispersed in an aqueous solution of sodium hydroxide to prepare a batter. This batter is subjected to aging at ambient temperature for several hours, and then transferred to an oven in which it is heated at about 100° C. to produce a product containing more than 20% sodium faujasite. The product comprising sodium faujasite has usefulness as a molecular sieve and/or in connection with cracking catalysts and/or for any other uses of sodium faujasite.

DESCRIPTION OF PREFERRED EMBODIMENTS

Reference is made to a plurality of examples intended to clarify the invention.

EXAMPLE I

An aqueous solution was prepared consisting of 16.7% sodium hydroxide in water, and having a weight ratio of 5 parts of water to 1 part of sodium hydroxide. A mixture is prepared consisting of about 81% de-exothermed kaolin and about 19% alumina alpha trihydrate. In such mixture, the silica to alumina unit mol ratio was essentially 1.5, that is about 1.5 mols of silica per mol of alumina. A batter was prepared consisting of about 3 parts of the powdered mixture and about 4 parts of the aqueous alkaline solution. The composition of the batter corresponded to about 4.5 parts of the mixture to 5 parts of water to 1 part of sodium hydroxide. The batter was aged at ambient temperature for about 5 hours and then transferred to an oven maintained at about 100° C. The progress of sodium faujasite formation during hot aging was followed by removing samples at suitable intervals and obtaining a determination of the amount of sodium faujasite present by X-ray diffraction.

TABLE I

| Hot aging, hours: | Weight percent faujasite |
|---|---|
| 5 | 28 |
| 10 | 55 |
| 12 | 57 |
| 15 | 61 |
| 20 | 62 |
| 30 | 61 |

It was noted that the silica to alumina unit mol ratio in the product after 60 hours was 3.5, thus indicating a designation of the sodium faujasite as a Zeolite Y.

EXAMPLE II

A batter was prepared following the general approach of Example I but providing a ratio of 5.2 parts of the clay-alumina trihydrate to 5 parts of water to 1 part of sodium hydroxide instead of the 4.5 to 5 to 1 of Example I. Inasmuch as the solids content was about 16% greater, the batter was initially of higher viscosity. The progress of sodium faujasite formation during hot aging as determined from a smoothed curve of measured data points was as follows.

TABLE II

| Hot aging, hours: | Weight percent faujasite |
|---|---|
| 5 | 8 |
| 10 | 25 |
| 12 | 45 |
| 15 | 55 |
| 20 | 59 |
| 30 | 61 |

The silica to alumina unit mol ratio of the product was 4.2.

Sodium faujasite was prepared by a control procedure in which the alumina was omitted but all other features of the method were essentially the same. The control batter had a ratio of 4.5 parts of de-exothermed kaolin to 5 parts of water to 1 part of sodium hydroxide. The data points were used in the preparation of a smoothed curve from which the following values were determined:

TABLE III

Hot aging, hours:          Weight percent faujasite
5 ----------------------------------------- 5
10 ---------------------------------------- 17
12 ---------------------------------------- 20
15 ---------------------------------------- 33

The silica to alumina unit mol ratio in the product was 4.7.

It can be noted that similar procedures, differing only as to the nutrient composition used, can lead to the following results after about 12 hours. The control (absence of alumina trihydrate) has about 20% sodium faujasite and thus is significantly inferior to the about 45% sodium faujasite of Example II or to the even more notable 57% sodium faujasite of Example I. If a comparison is made concerning the time required to reach 55% sodium faujasite in the product, then Example I describes a method of achieving such result within 10 hours and Example II within 15 hours; whereas the control without any alumina trihydrate yields only 17 weight percent sodium faujasite in 10 hours and 33 weight percent sodium faujasite in 15 hours.

Such data indicate that the sodium faujasite can be prepared more rapidly from compositions featuring the presence of alumina alpha trihydrate as a minor component of the nutrient system.

EXAMPLES III–IX

The speed of faujasite formation is dependent in part upon the size of the batch. It was expected, on the basis of scale up of other preparations that production of sodium faujasite would be slower in batches larger than the laboratory tests of Examples I and II. Industrial size equipment was employed in preparing sodium faujasite as indicated in the tables. In each case, the mixture was 19% alumina trihydrate and 81% de-exothermed kaolin, and the aluminosilicate/water ratio was 4.5/5. Because the molarity of the sodium hydroxide solution was varied, the ratios were 4.5/5/1 for 5 molar, 5.3/5.9/1 for 4.2 molar and 5/5.6/1 for 4.45 molar. The range is satisfactorily expressed as from about 4.5 to about 5.5 parts of aluminosilicate mixture per from about 5 to about 6 parts of water per 1 part of sodium hydroxide. In each case, ambient aging was for 5 hours, and the hours in the 100° C. oven were evaluated throughout only a narrow range as shown in Table IV.

TABLE IV

| Ex. | Pounds in batch | NaOH sln. molarity | Hours at 100° C. | Percent Na faujasite |
|---|---|---|---|---|
| III | 100 | 5 | 30 | 51.2 |
| IV  | 100 | 4.45 | 20 | 50.0 |
| V   | 100 | 4.45 | 17 | 33.6 |
| VI  | 100 | 4.2 | 25 | 53.5 |
| VII | 100 | 4.2 | 25 | 40.5 |
| VIII| 200 | 4.2 | 30 | 41.3 |
| IX  | 200 | 4.2 | 36 | 46.0 |

The sodium faujasite was comminuted, mixed with aqueous sodium silicate (in final catalyst, 16% $SiO_2$ derived from silicate) spray dried, washed with dilute acid, and then subjected to ion exchange with an aqueous solution of ammonium nitrate a selected number of times, whereby the sodium oxide content of the catalyst was reduced. In some cases, the amount of faujasite detectable by X-ray after artificial aging for 4 hours and/or other pertinent properties were noted as shown in Table V.

TABLE V

| Ex. | No. of exch. | Weight percent $Na_2O$ | Weight percent Faujasite | Attrition, wt. percent/hr. 0–5 | Attrition, wt. percent/hr. 5–22 | Pore vol., cc./g. | Surf. area, m.²/g. |
|---|---|---|---|---|---|---|---|
| III  | 8  | 0.26 | nm   | nm   | nm   | nm   | 41 |
| IV   | 7  | 1.25 | nm   | 3.14 | 0.67 | 0.63 | nm |
| V    | 6  | 0.77 | 15.7 | 0.60 | 0.19 | 0.39 | 86 |
| VI   | 6  | 1.69 | 5.7  | 2.21 | 0.94 | 0.62 | 54 |
| VII  | 12 | 0.79 | 12.0 | 0.24 | 0.13 | 0.26 | 64 |
| VIII | 8  | 0.74 | nm   | nm   | nm   | nm   | nm |
| IX   | 6  | 0.86 | 12.0 | 1.52 | 0.29 | nm   | 77 |

The thus aged catalyst was evaluated by the Cat D procedure to obtain the data shown in Table VI.

TABLE VI

| Ex. | Volume percent gasoline | Weight percent Coke | Weight percent Gas | Gas grav. | Weight percent Conv. | Weight percent Selec. |
|---|---|---|---|---|---|---|
| III  | 41.0 | 1.8 | 11.2 | 1.50 | 47.6 | 72.7 |
| IV   | 56.3 | 1.6 | 12.8 | 1.55 | 62.0 | 76.7 |
| V    | 59.7 | 1.8 | 16.3 | 1.61 | 68.6 | 73.6 |
| VI   | 59.8 | 1.7 | 14.2 | 1.60 | 66.4 | 76.2 |
| VII  | 57.5 | 2.2 | 14.1 | 1.56 | 64.9 | 74.8 |
| VIII | 63.0 | 2.2 | 14.7 | 1.52 | 70.1 | 75.8 |
| IX   | 59.1 | 1.5 | 13.6 | 1.59 | 65.0 | 76.8 |

The Cat D performance data after such accelerated aging were indicative that the catalyst was superior to some faujasite cracking catalysts which have been marketed.

The invention claimed is:

1. In a method in which a product comprising sodium faujasite is prepared from a nutrient composition comprising sodium hydroxide, water, and de-exothermed kaolin, such method including steps of aging a nutrient composition for several hours at ambient temperature and thereafter subjecting the ambient-aged material to an elevated temperature of about 100° C. for a controlled hot aging period, the improvement which consists of: preparing an admixture of de-exothermed kaolin and alumina alpha trihydrate in an amount constituting about 19% of the admixture, said de-exothermed kaolin being calcined at a temperature of from about 1010° C. to about 1050° C. to provide a product having a residual exotherm less than about 8% of the exotherm of metakaolin, such de-exothermed kaolin having no significant amounts of mullite readily detectable therein; preparing a nutrient composition consisting of from about 4.5 to about 5.5 parts of said admixture per from about 5 to about 6 parts of water per 1 part of sodium hydroxide and subjecting such nutrient composition to ambient aging and hot aging at about 100° C. to prepare a composition containing more than 20% sodium faujasite.

2. The method of claim 1 in which the ratio of admixture to water to sodium hydroxide is about 4.5 to 5 to 1 and in which the sodium faujasite concentration is more than 50% after 10 hours of hot aging, thereby shortening the time at which the nutrient is maintained at about 100° C.

3. The method of claim 1 in which the ratio of admixture to water to sodium hydroxide is about 5.2 to 5 to 1 and in which the sodium faujasite concentration is more than 50% after 20 hours of hot aging.

4. The method of claim 1 in which the ratio of admixture to water to sodium hydroxide is about 5.3:5.9:1.

References Cited

UNITED STATES PATENTS

| 3,515,511 | 6/1970 | Flank | 23—112 |
| 3,130,007 | 4/1964 | Breck | 23—113 |
| 3,365,272 | 1/1968 | Cornelius et al. | 23—113 |
| 3,431,219 | 3/1969 | Argauer | 252—455 |

CARL F. DEES, Primary Examiner

U.S. Cl. X.R.

23—112